United States Patent [19]

Poirel

[11] Patent Number: 6,088,448

[45] Date of Patent: Jul. 11, 2000

[54] TELECOMMUNICATION EQUIPMENT COMPRISING A MAGNETIC DEVICE FOR RECOGNIZING PERIPHERALS

[75] Inventor: Alain Poirel, Saint quen en Belin, France

[73] Assignee: U.S. Philips Corporation, New York, N.Y.

[21] Appl. No.: 09/025,371

[22] Filed: Feb. 18, 1998

[30] Foreign Application Priority Data

Feb. 25, 1997 [FR] France .................................. 97 02226

[51] Int. Cl.$^7$ .................................................. H04M 1/00
[52] U.S. Cl. .......................................................... 379/438
[58] Field of Search .................................... 379/433, 428, 379/447, 438; 455/575, 90

[56] References Cited

U.S. PATENT DOCUMENTS 4,984,295  1/1991  Engstrom et al. ...................... 455/575

FOREIGN PATENT DOCUMENTS

4342052A1  6/1995  Germany ......................... G06F 13/10

Primary Examiner—Jack Chiang

[57] ABSTRACT

An apparatus for connecting to a number of peripheral devices has a detection device for detecting coupling of a particular one of the peripheral devices to the apparatus. The detection device has a first magnetic means and the particular one of the peripheral devices has a second magnetic means for cooperating with the first magnetic means. The first and second means form a unique pair for uniquely recognizing the particular one of the peripheral devices among the peripheral devices.

9 Claims, 4 Drawing Sheets

TELECOMMUNICATION EQUIPMENT COMPRISING A MAGNETIC DEVICE FOR RECOGNIZING PERIPHERALS

FIELD OF THE INVENTION

The invention relates to telecommunication equipment comprising a main apparatus intended to be connected to a peripheral, said equipment comprising a magnetic device for recognizing peripherals, formed by at least one pair of a magnetic transmitter and receiver for producing a peripheral identification signal.

The invention also relates to any other equipment formed by a main apparatus intended to be connected to a peripheral, comprising such a magnetic device for recognizing peripherals.

BACKGROUND OF THE INVENTION

When an accessory or peripheral is connected to a main apparatus, it may be necessary to adapt certain parameters before a dialogue is commenced between two apparatuses. For connecting, for example, a peripheral of the type of a hands-free kit, portable computer or fax to a radio telephone for a specific application when it is connected, the peripheral must notably be identified for feeding the peripheral with the adequate supply voltage and for activating the appropriate communication protocol.

Telecommunication equipment of the type defined in the opening paragraph is known from the document DE 43 42 052 A1. This equipment is formed by a pilot computer connected by a data bus to peripheral cards having a respective address in a memory of the EEPROM type (Electrically Erasable Programmable Read Only Memory) whose reading can be activated or deactivated under the control of a Hall-effect magnet/sensor pair so as to authorize the pilot computer to read the address from the card.

According to the cited prior art, the following three steps are necessary for proceeding to the recognition of the peripheral:

establishing the connection between the main apparatus and the peripheral, positioning a magnet opposite the magnetic sensor of the peripheral for activating a memory in the read mode, reading the contents from the memory to know the address of the card and thus identify the peripheral.

SUMMARY OF THE INVENTION

It is an object of the present invention to provide means for directly recognizing a type of peripheral from various known types, in a single step of a connection of said peripheral to a main apparatus.

Therefore, telecommunication equipment of the type mentioned above is characterized in that said signal is produced directly when said peripheral is connected to said main apparatus.

According to an important characteristic feature of the invention, telecommunication equipment of the type already mentioned is characterized in that said magnetic recognition device includes means for producing a start-of-disconnection signal for a peripheral. Thus, in addition to the identification of a known peripheral, the recognition device permits to detect a possible disconnection of the apparatus to trigger the power supply cutoff in the direction of the peripheral and to stop all the communication processes of the main apparatus.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
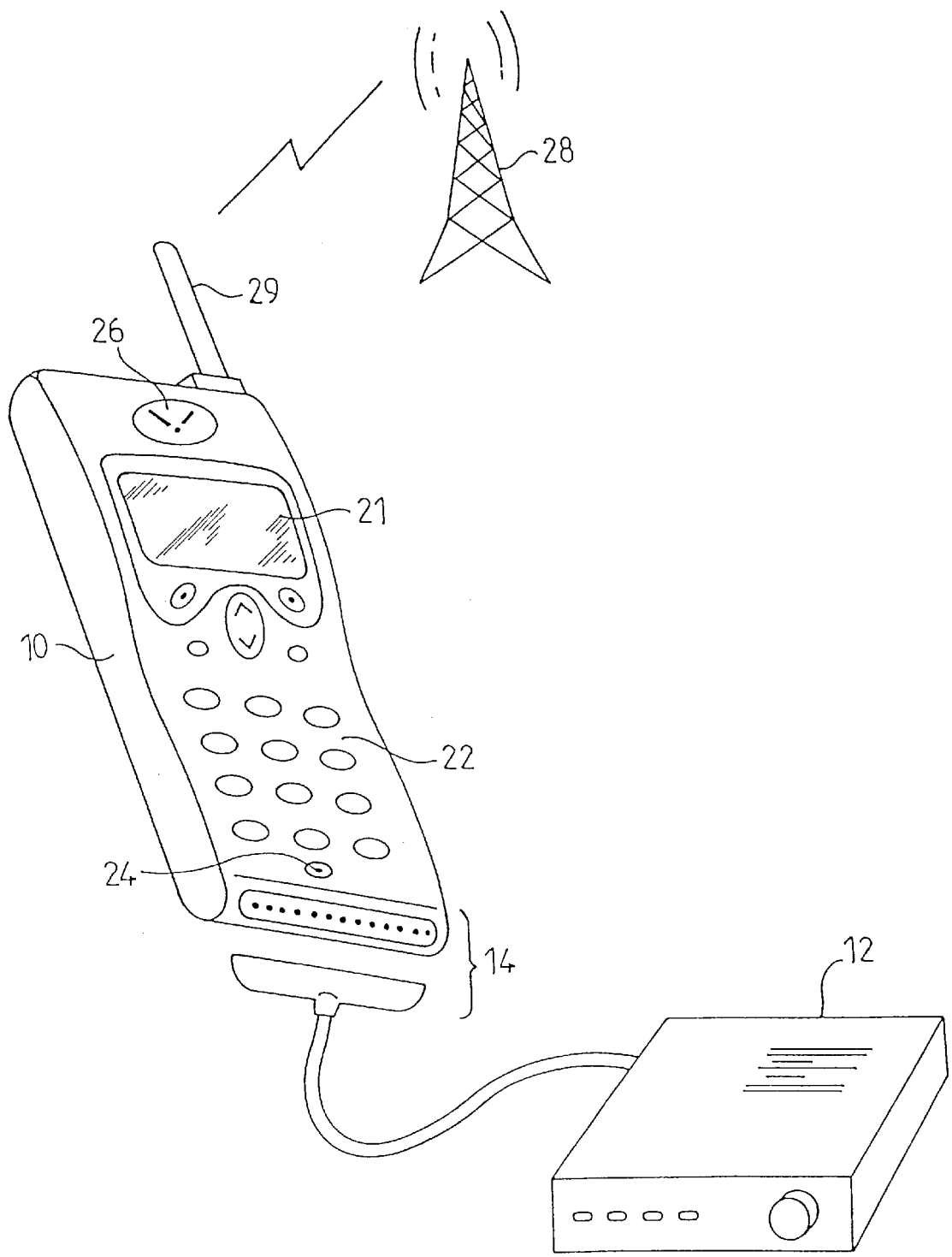
FIG. 1 represents telecommunication equipment according to the invention.

The telecommunication equipment shown in FIG. 1 comprises a main apparatus 10 and a peripheral 12 put into contact by a connection device 14. Although the main apparatus 10 is a radio telephone, the device for recognizing peripherals according to the invention (not shown on this figure) may be applied to any other main apparatus intended to receive a peripheral with means provided by the invention. The radio telephone 10 comprises a display screen 21, a keyboard 22, a microphone 24 and an earphone 26. A base site 28 connects the radio telephone 10 to the mobile telephony network for exchanging radio signals with an antenna 29 coupled to a transceiver device.

Figure 2:
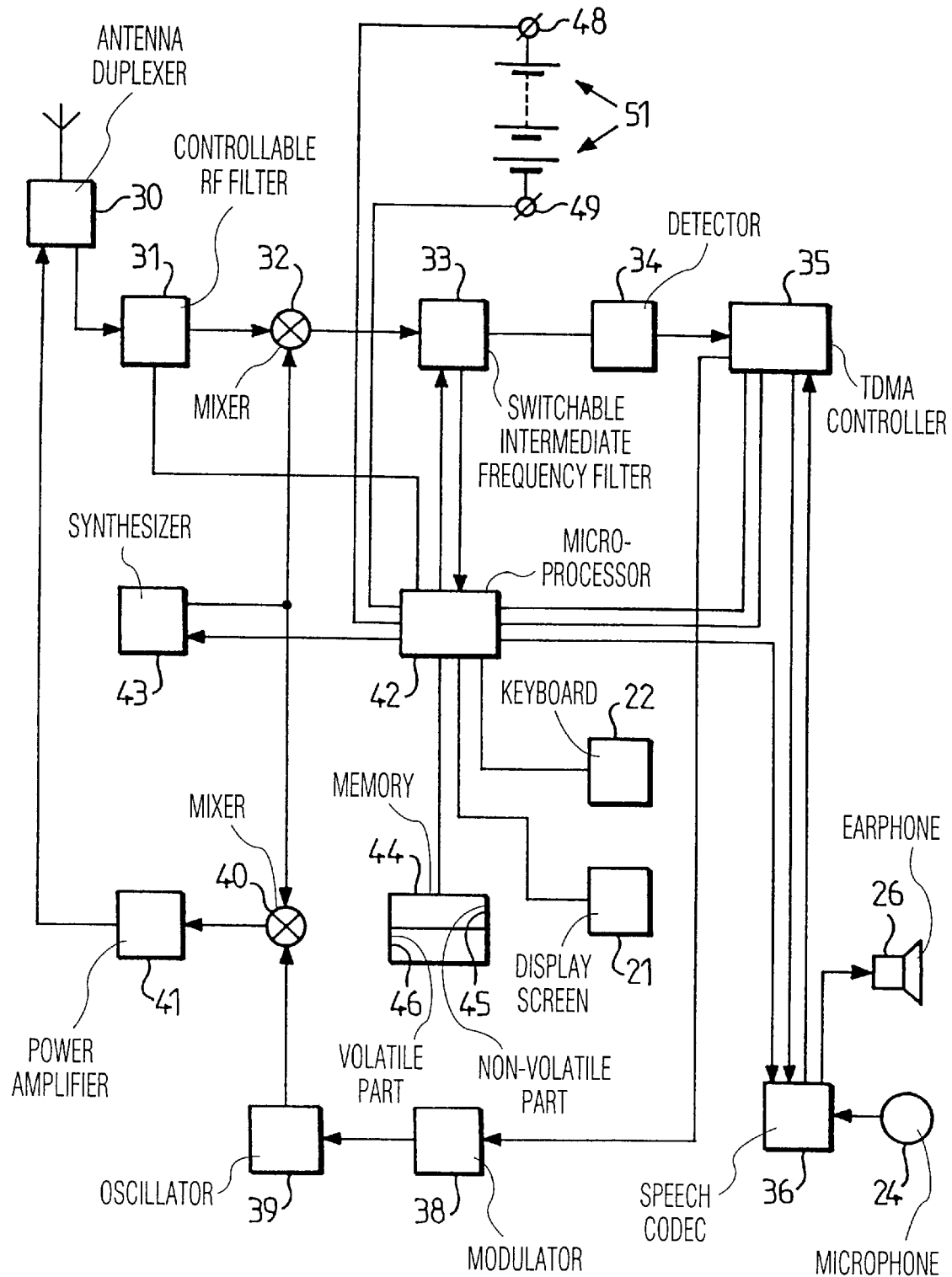
FIG. 2 is a block circuit diagram of the radio telephone 10 shown in FIG. 1.

European patent EP 494 526 B1 gives a detailed description of the radio telephone 10 as it is represented in FIG. 2. It comprises a receiving circuit and a transmitting circuit coupled both to an antenna duplexer 30. The receiving circuit comprises in a cascade arrangement a controllable RF filter 31, a mixer 32, a switchable intermediate frequency filter 33, a detector 34, a time-division multiple access (TDMA) controller 35, a speech coder (CODEC) 36 and the earphone 26. The transmitting circuit comprises in a cascade arrangement the microphone 24, the speech coder (CODEC) 36, the time-division multiple access (TDMA) controller 35, a modulator 38, an oscillator 39, a mixer 40 and a power amplifier 41. A microprocessor 42 is provided for controlling the functionalities of the telephone 10.

Various conventional characteristic features, such as monitoring a synthesizer 43 to obtain a channel that has a particular frequency, controlling the TDMA controller 35, sampling the keyboard 22 and controlling the display screen 21 will no longer be described here, because their functions are known.

A memory 44 including a non-volatile part 45 and a volatile part 46 is coupled to the microprocessor 42. The non-volatile memory part 45 contains a program for processing functionalities of the telephone 10. Moreover, the apparatus comprises power supply connections 48 and 49 connected to an interchangeable battery 51 for supplying power to the apparatus.

Figure 3A:
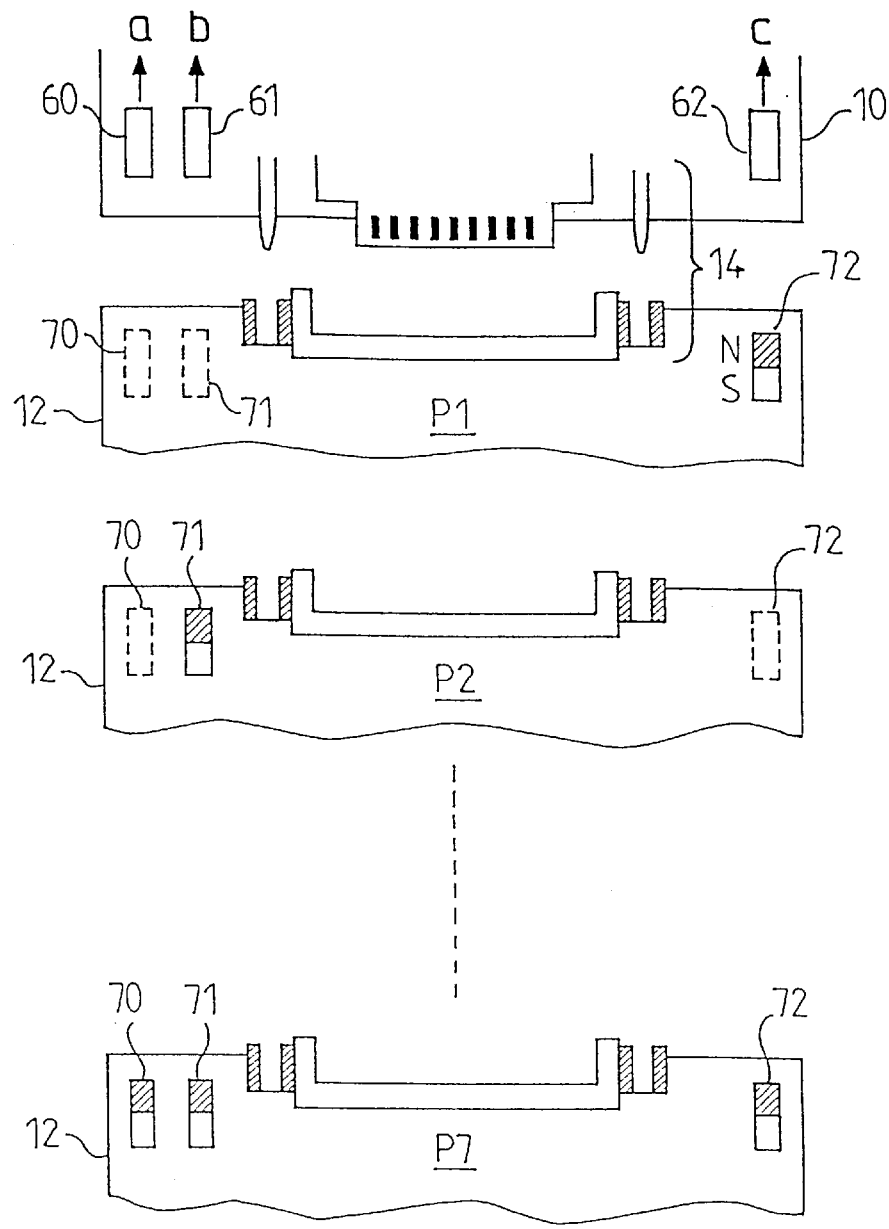
FIG. 3 represents a magnetic device for recognizing peripherals according to a preferred embodiment of the invention utilizing a binary coding.
Figure 3B:
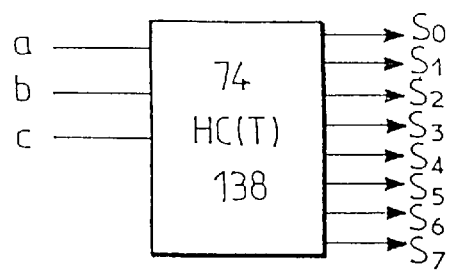

The diagram of FIG. 3 illustrates a device for recognizing peripherals, showing the essential parts for embodying the invention in the particular case where there are no more than 7 types of different peripherals to be identified from "Type 1" to "Type 7", represented by the peripherals P1 to P7, respectively. The principle of the invention comprises utilizing a magnetic effect for transmitting an identification signal of a peripheral.

If the number of accessories (or peripherals) is very limited, a binary coding for transmitting the information signal could be used.

In A in FIG. 3, three binary Hall-effect sensors 60, 61, 62 are placed in the main apparatus 10 and from one to three miniature magnets are placed in the peripherals P1 to P7 at three positions 70, 71, 72 so that, when the two devices are connected by the connection device 14, the magnets are automatically placed opposite the sensors 60, 61 and 62 to form magnetic transceiver pairs (70/60, 71/61 and 72/62). The pair 72/62, several centimeters away from the two other pairs may be used as a connection or disconnection detector because its action may be delayed relative to that of the other two pairs 71/61 and 72/62. In this case, all the peripherals P1 to P7 are to comprise a magnet at position 72. When the north face of a magnet is placed opposite a binary Hall-effect sensor, this sensor detects the magnetic field of the magnet and its output becomes active. Thus, the sensors 61, 62 and 63 transmit on their respective outputs a, b and c binary states (active or inactive) to a demultiplexing device or to a microprocessor for processing the information.

A peripheral discrimination system without a microcontroller, intended for the equipment shown under A is represented in B in FIG. 3. The states of the three outputs a, b and c are sent to an input of a "3 to 8" demultiplexer of the type 74 HC(T) 138 for detecting eight situations (2 exp(3)) respectively, on the 8 outputs S0 to S7. The activation of the output S0 indicates that no peripheral is connected and the activation of an output S1 to S7 indicates that a peripheral of the Type 1 to 7 has been detected. The Table I represents the results obtained as a function of the binary states of the outputs a, b and c.

TABLE I

| a | b | c | Detection |
|---|---|---|-----------|
| 0 | 0 | 0 | no |
| 0 | 0 | 1 | Type 1 |
| 0 | 1 | 0 | Type 2 |
| 0 | 1 | 1 | Type 3 |
| 1 | 0 | 0 | Type 4 |
| 1 | 0 | 1 | Type 5 |
| 1 | 1 | 0 | Type 6 |
| 1 | 1 | 1 | Type 7 |

Figure 4:
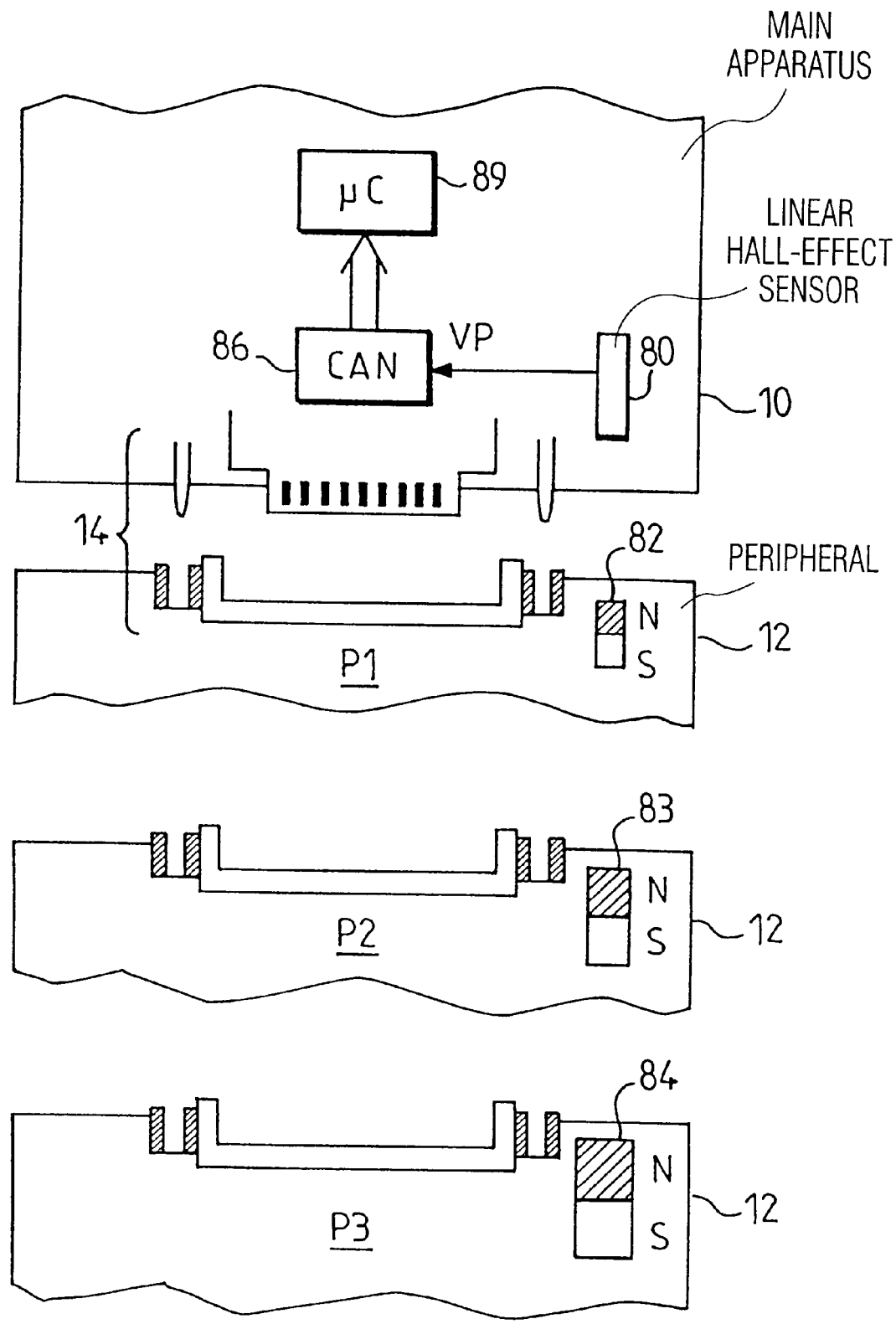
FIG. 4 illustrates another embodiment of the invention.

For embodying the invention in the general case where there are N peripherals to be identified, where N is greater than 7, the number of pairs of binary transmitters/receivers could be augmented in each apparatus or another embodiment could be chosen such as, for example, the one represented in FIG. 4 which furthermore offers a small size and may be used in small-size devices.

The pairs of magnetic binary transmitters/receivers have been advantageously replaced by a linear Hall-effect sensor 80 in the main system 10 associated to magnets having different strengths 82, 83, 84 in the peripherals P1 to P3. To simplify the diagram, only three types of peripherals are shown, although this embodiment permits of recognizing a larger number. An analog/digital converter (CAN) 86 coupled to the linear sensor 80 cooperates with a microcontroller 89 for detecting the presence of a peripheral of the Types 1 to 3 and a start of a disconnection. The linear sensor 80 is indeed capable of measuring the magnetic field strength emitted by the magnet and of producing an output voltage VP that is proportional to the measured magnetic field strength.

This embodiment is particularly cost-effective in the case of an application to a radio telephone of the GSM type (Global System for Mobile telecommunication) or to any other terminal comprising complex integrated circuits of which a microprocessor and an analog/digital converter CAN have a free input.

The voltage VP is in that case applied to the free input of the CAN and as a function of the 8-bit-code obtained on the output of the CAN, the microprocessor identifies the type of peripheral placed near to the linear sensor. The Table II gives several examples of digital values (codes) read from the output of the CAN representing fractions of the respective measured input voltage VP. For example, for an output code situated between 10 and 50, the measured voltage VP is situated between 10/256 volts and 50/256 volts which corresponds to the detection of a Type 1 peripheral.

TABLE II

| Code | Detection |
|------|-----------|
| [0;10] | Short-circuit |
| [10;50] | Type 1 |
| [50;150] | Type 2 |
| [150;240] | Type 3 |
| [240;255] | Open circuit |

Thus, telecommunication equipment comprising a magnetic device for recognizing peripherals, cost-effective in terms of components and space, capable of directly detecting various types of peripherals when they are connected to the main apparatus, has just been described in detail. Obviously, the invention is not restricted to the embodiments proposed by way of example, other variants of the invention will be apparent to a man or woman skilled in the art, more particularly, in respect of the choice of the magnetic transceiver pairs. For example, the Hall-effect sensors could be replaced by reed switch bulbs without these variants leaving the scope of the invention.

What is claimed is:

1. An apparatus for connecting to a particular one of a plurality of different peripheral devices, said apparatus comprising:
   a detection device for detecting coupling of said particular one of said plurality of different peripheral devices to said apparatus, said detection device comprising first magnetic means for cooperating with second magnetic means comprised in said particular one of said plurality of different peripheral devices, whereby said first and second magnetic means form a unique pair for uniquely recognizing said particular one of said plurality of different peripheral devices among said plurality of different peripheral devices coupled to said apparatus.

2. An apparatus according to claim 1, wherein said first magnetic means comprises a linear Hall-effect sensor, and said second magnetic means is a single magnet, said unique pair being formed through a given magnet strength for said particular one of said plurality of peripheral devices, magnet strengths of different peripheral devices being different.

3. An apparatus according to claim 1, wherein said first magnetic means comprises a plurality of Hall-effect sensors positioned at different positions within said apparatus, and said second magnetic means comprises at least one magnet positioned in said particular one of said plurality of peripheral devices, said at least one magnet cooperating with a corresponding one of said plurality of Hall-effect sensors when said particular one of said plurality of peripheral devices is coupled to said apparatus, said unique pair being formed through varying the number and position of magnets in said plurality of peripheral devices.

4. An apparatus according to claim 1, wherein said detection device comprises a first analog-to-digital converter that is coupled to said first magnetic means, said first analog-to-digital converter providing a digital identification signal for identifying said particular one of said plurality of peripheral devices.

5. An apparatus according to claim 1, wherein said detection device comprises a second analog-to-digital converter that is coupled to said first magnetic means, said second analog-to- digital converter providing a digital start-of-disconnection signal for said particular one of said plurality of peripheral devices.

6. An apparatus according to claim 1, wherein said first magnetic means and said second magnetic means form a Reed switch.

7. A peripheral device for coupling to an apparatus with a detection device for detecting coupling of said peripheral device to said apparatus, said detection device comprising first magnetic means, and said peripheral device comprising:

second magnetic means for cooperating with said first magnetic means, said first and second magnetic means forming a unique pair for uniquely recognizing said peripheral device among a plurality of different peripheral devices coupleable to said apparatus.

8. A peripheral device as claimed in claim 7, wherein said first magnetic means comprises a linear Hall-effect sensor, and said second magnetic means is a single magnet, said unique pair being formed through a given magnet strength for said peripheral device, magnet strengths of different peripheral devices being different.

9. A peripheral device as claimed in claim 7, wherein said first magnetic means comprises a plurality of Hall-effect sensors positioned at different positions within said apparatus, and said second magnetic means comprises at least one magnet positioned in said peripheral device, said at least one magnet cooperating with a corresponding one of said plurality of Hall-effect sensors when said peripheral device is coupled to said apparatus, said unique pair being formed through varying the number and position of magnets among said plurality of peripheral devices.

* * * * *